T. M. DANIELS & J. C. HOLSCHEMACHER.
NUT TAPPING MACHINE.
APPLICATION FILED SEPT. 22, 1914.
1,141,779.
Patented June 1, 1915.
3 SHEETS—SHEET 1.
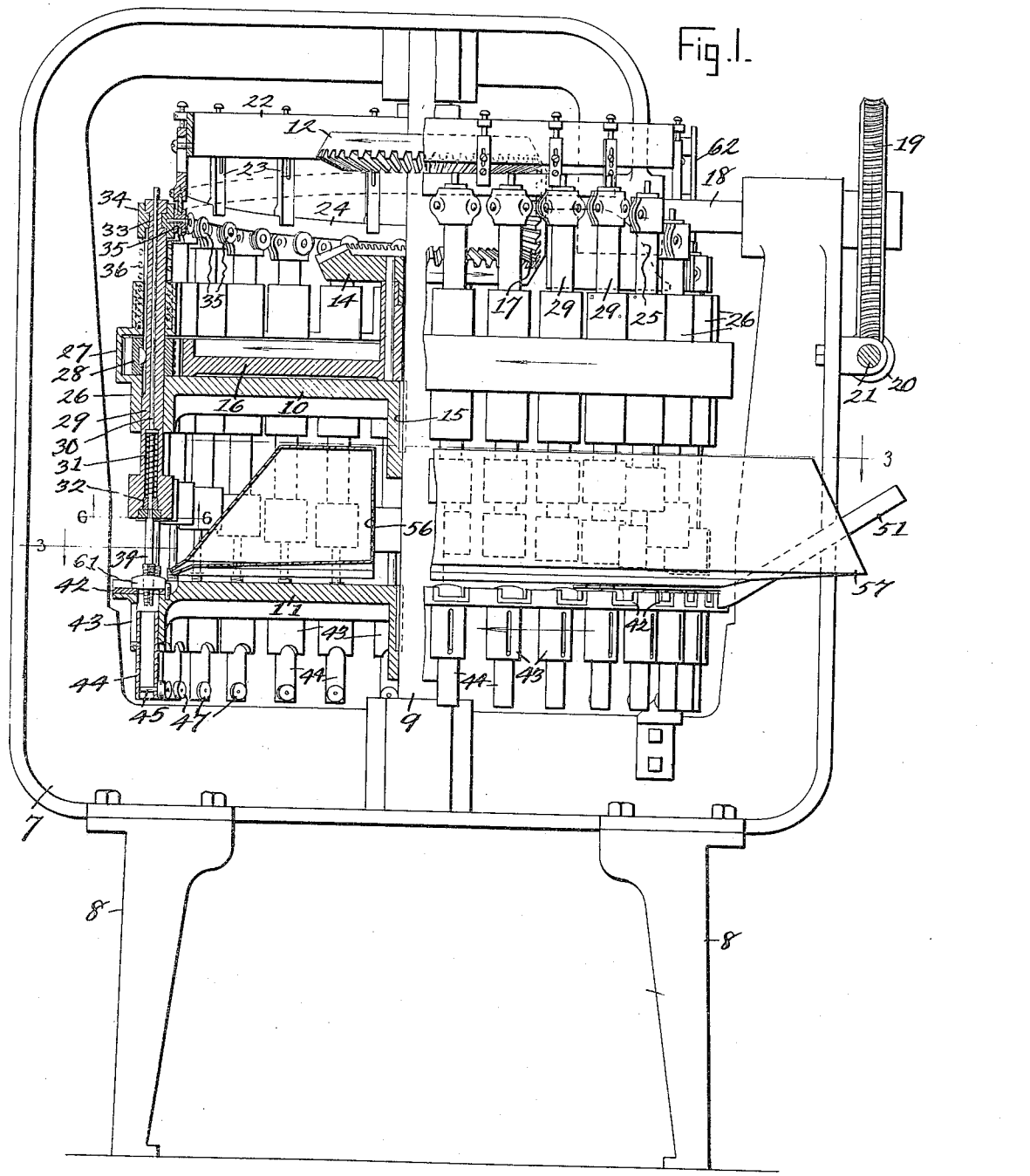
Fig. 1.
WITNESSES
INVENTORS
Thomas M. Daniels
Julius C. Holschemacher
BY 
ATTORNEYS

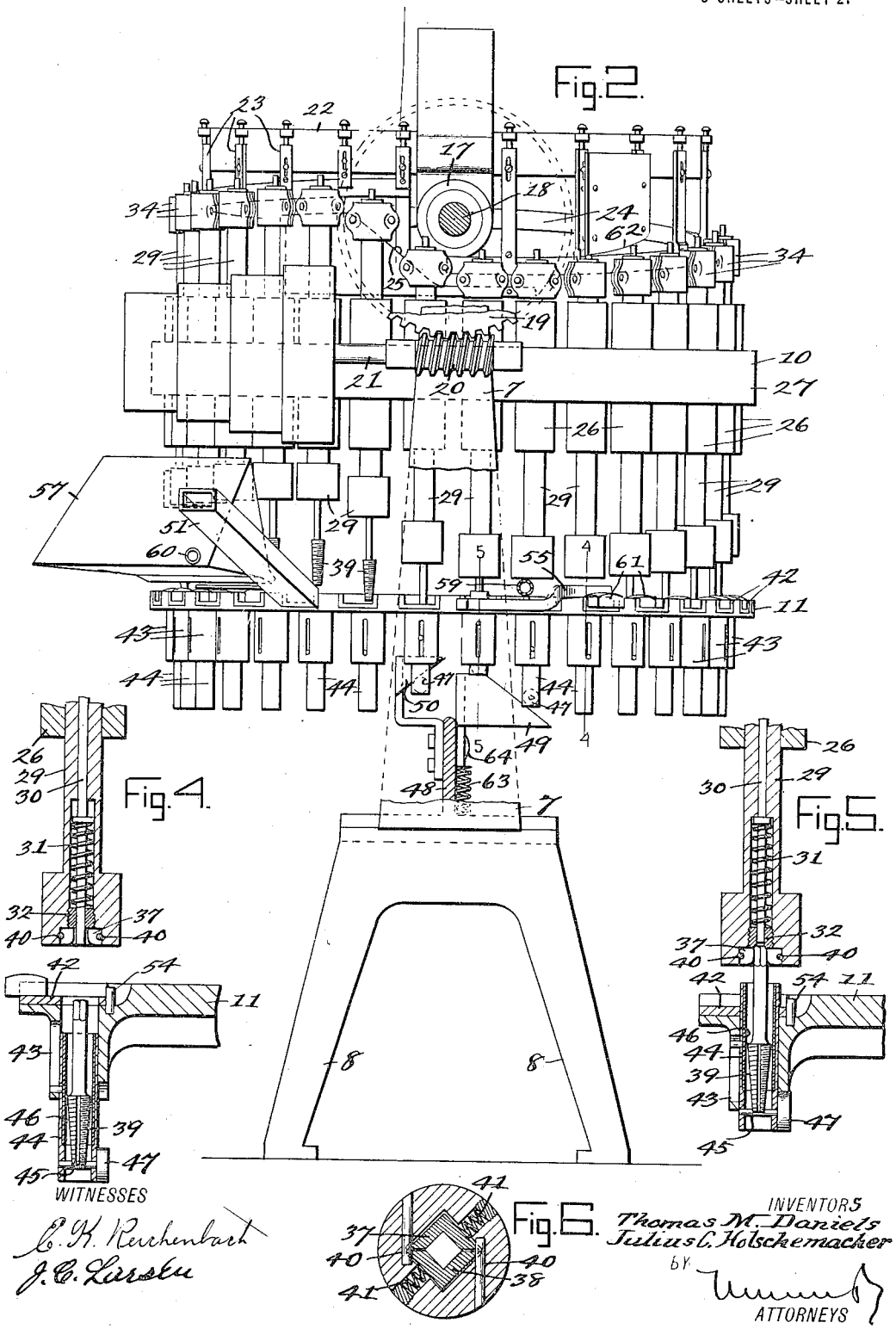

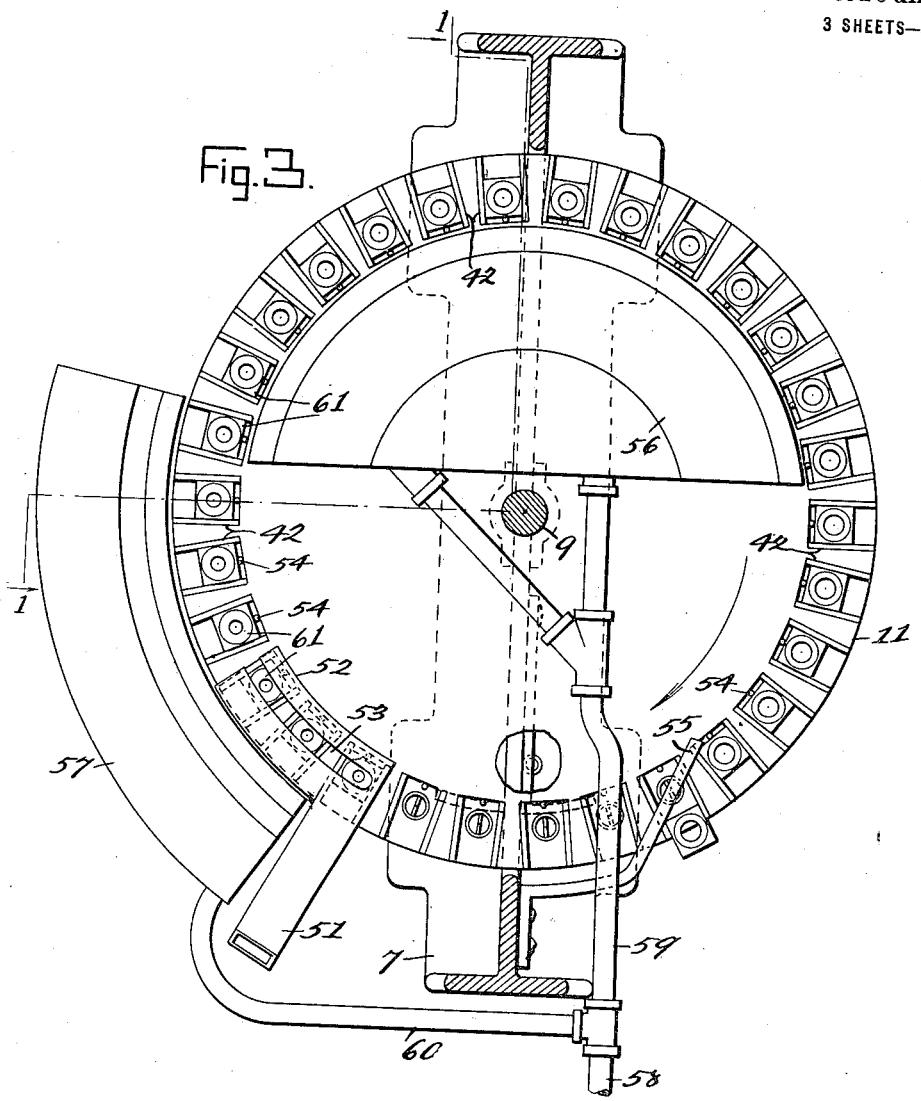

UNITED STATES PATENT OFFICE.

THOMAS MARION DANIELS AND JULIUS C. HOLSCHEMACHER, OF CHICAGO, ILLINOIS, ASSIGNORS, BY MESNE ASSIGNMENTS, TO DANIELS SAFETY DEVICE COMPANY, OF CHICAGO, ILLINOIS, A CORPORATION OF ILLINOIS.

NUT-TAPPING MACHINE.

1,141,779. Specification of Letters Patent. Patented June 1, 1915.

Application filed September 22, 1914. Serial No. 862,876.

*To all whom it may concern:*

Be it known that we, THOMAS M. DANIELS and JULIUS C. HOLSCHEMACHER, citizens of the United States, and residents of Chicago, in the county of Cook and State of Illinois, have invented certain new and useful Improvements in Nut-Tapping Machines, of which the following is a specification.

Our invention relates to machines for producing the screw-threads in nuts already provided with the bores, and the main object is to provide such a machine which accomplishes this result automatically and continuously.

A further object is to insure a uniform thread entirely through the nut, this involving passing a tap entirely through a nut, and afterward returning the same to initial, nut engaging, position.

A further object is to provide such a machine which is very speedy in operation and, therefore, of great capacity.

A further object is to provide such a machine which is readily adaptable to various sizes of nuts, and to various pitches of threads; and further objects are to provide such machines which are simple in construction, positive in operation, self-lubricating, and comparatively inexpensive.

Our invention is fully described in the following specification, of which the accompanying drawings form a part, in which like parts are designated by the same reference characters in each of the views, and in which:—

Figure 1 is a side elevation of our nut-tapping machine, partly in section on the line 1—1 of Fig. 3; Fig. 2 is a side view thereof, partly broken away; Fig. 3 is a section taken on the line 3—3 of Fig. 1; Fig. 4 is an enlarged section on the line 4—4 of Fig. 2; Fig. 5 is a similar section on the line 5—5 of Fig. 2; and Fig. 6 is a similar section on the line 6—6 of Fig. 1.

In the drawings forming a part of this application we have shown a present preferred form of embodiment of our invention, comprising a suitable frame 7, legs 8, a central, vertical, shaft 9, carrying two carriers 10 and 11 keyed thereto, two bevel-gears 12 and 14, the former keyed thereto and the latter keyed, as shown at 15, to a spur-gear 16, a bevel pinion 17 enmeshed with said bevel-gears and revoluble with a counter-shaft 18 having a worm-gear 19 on its outer end enmeshed with a worm 20 on the drive-shaft 21, and it will be seen that the carriers 10 and 11 and bevel gear 12 revolve with the shaft 9, whereas the bevel-gear 14 and spur-gear 16 revolve in the opposite direction.

At the top of the machine is a support 22 for a plurality of hangers 23 carrying a cam 24 at their lower ends, said hangers being individually adjustable, in any desired manner, whereby the inclination of the cam 24 may be adjusted with respect to the support 22, this adjustment being a material factor in adapting the machine to different pitches of threads in the nuts, and we also provide a separate cam 25, Fig. 2, bridging the gap between the ends of the metal band forming the cam 24.

The carrier 10 is provided with a plurality of vertically arranged tubular guides 26 on the periphery thereof and extending above and below the same, being enlarged intermediate the height of each guide, as shown at 27, Fig. 1, to receive a pinion 28 enmeshed with the spur-gear 16, a spindle 29 being slidably keyed within each pinion; each spindle has a central bore therethrough for a rod 30 normally held in uppermost position by means of a spring 31 bearing upon a flange thereon and upon a threaded plug 32 in an enlarged head of the spindle, said spindle being peripherally grooved in its upper end, at 33, to receive a collar 34 provided with a roller 35 grooved to engage with the lower edge of the cam 24, normally, and with the cam 25 under conditions to be described, and we may, if desired, employ a spring 36, indicated in dotted lines in Fig. 1, for maintaining the spindle in contact with the cam 24.

The lower enlarged head of each spindle is recessed to receive two members 37 and 38 of a clutch for a tap 39, said members being held in position by means of pins 40 and springs 41, Fig. 6 and the interior, lower, edges of which are rounded to permit the entry of the angular end of the tap, this being clearly shown in Figs. 4 and 5.

The carrier 11 has a plurality of recesses formed in the upper face thereof in absolute register with the positions of corresponding spindles, a nut receiving block 42 being arranged in each recess, and each of said blocks is removable whereby it may be substituted by another adapted for a larger or smaller nut, and whereby it may be turned upside down for a reason later explained. Beneath each of the said blocks 42 is a tubular, slotted, guide 43 for a tube 44 provided with a pin engaged in said slot to prevent the rotation of the tube in the guide but permitting its vertical movement therein, a transverse rod 45 being provided in the lower end of each tube 44 to permit shavings to fall therethrough but preventing a corresponding bit from falling therethrough, each tap being preferably transversely grooved, as shown in Figs. 1, 4 and 5, at its lower end to engage with said rod 45 and thus maintain its relationship with the clutch from which it has been forced, as will be later explained. We also provide a supplemental tube 46 within each tube 45 which is adapted to be substituted by another of a proper internal diameter when larger or smaller taps are employed, and we also provide a roller 47 at the inner side of the lower, exterior, end of each tube 44.

Mounted upon a suitable support 48, Fig. 2, is a cam or incline 49 arranged in the path of the rollers 47, and adjacent thereto is a complemental cam or incline 50 also in the path of said rollers, and the reason for which will be later set forth.

As shown in Figs. 1, 2 and 3, we provide a feed chute 51 for the nuts to be tapped, an extension 52 being provided thereon for nut guidance and slotted at 53 to allow the downward passage of the taps to the nuts, a pin 54 limiting the movement of said nuts toward the center of the machine, and a suitable spring, not shown, forcing the nuts against their corresponding pins, said spring being within the chute extension, and this extension is made of a length insuring tap engagement with a nut before the nut leaves said extension, after which the nuts are held in position by the respective taps.

At 55, Fig. 3, is shown an arm which is arranged slightly above the horizontal plane of the upper surfaces of the nut blocks 42, as clearly shown in Fig. 2, but lower than the upper surfaces of the nuts, and this arm tends to force the nuts outwardly from their resting places, away from the machine, after having been tapped.

We also provide a lubricant reservoir 56, partially shown in Figs. 1 and 3, on the inner side of the taps 39 and having a suitable spout for directing lubricant upon the nuts being tapped, as many spouts as are desirable being employed, and we also provide an exterior reservoir 57 for the same purpose, said reservoirs being connected with a supply pipe 58 by means of pipes 59 and 60, respectively.

The untapped nuts, shown at 61, are fed through the chute 51 and to their respective seating blocks 42 and are carried along with the carrier 11, but the carrier 10 moves therewith, with the result that the spindles 29 are successively moved downwardly because of the cam 24 to move the taps 39 into the corresponding nuts; the spur-gear 16 is meanwhile revolving in an opposite direction, resulting in the rapid rotation of the spindles and taps, and thus cutting the threads in the respective nuts.

When the thread of a nut has been completed the carriers 10 and 11 have the nut and tap through an arc of a circle which brings them under a cam 62 adjustably hung from the support 22, the top of the rod 30 in the spindle being forced downwardly upon contact with this cam, and the tap is released from its clutch and falls into the tube 44; immediately thereafter, the arm 55 strikes against the inner side of the tapped nut and forces it out of the machine and into a suitable receptacle not shown; when the nut has been removed, the roller 47 of the tap carrying tube 44 strikes against the cam 49 and said tube is forced upwardly and thereby forces the tap back into its clutch, the members 37 and 38 thereof yielding because of their springs 41; the roller 47 then leaves the cam 49 and impinges on the cam 50 which moves the tube 44 downwardly into initial position; at the same time, the roller 35 on the spindle strikes the rise of the bridging cam 25 and is carried upwardly into initial position, and into contact with the cam 24, the tap now being ready for another nut which will be seated beneath said tap by the time it is again forced downwardly by the cam 24, and this operation is repeated for all the spindles and taps, of which there may be any number, but corresponding to the number of nut seating blocks 42.

In the event of a shortage of taps, or the absence of several from the machine, the corresponding blocks 42 may be removed, turned upside down, and replaced, thus blocking off the exit from the nut chute 51, and no nuts are fed thereto; in Fig. 2 we have shown a spring 63 for the cam 49, said cam being pivoted at 64, whereby it may yield slightly to the pressure of the rollers 47. It will thus be seen that each of a plurality of nuts are successively engaged, a tap forced therethrough, and thrown from the machine, and said machine receives said taps and returns them to initial positions, automatically, and continuously, and, while we have shown the nuts as carried in a horizontal plane, they might just as readily be carried in a vertical or in an inclined plane, very little change being required over the details of construction shown.

Our invention is simple, though highly efficient, designed for nuts of various sizes, for taps of different sizes, and for different pitches of screw-threads, it being necessary to change the degree of inclination of the cam 24 for different screw pitches, and this is easily possible because of the adjustable hangers, the approximate adjustment being secured by loosening the bolt in the slots thereof, and the accurate adjustment by means of the screws above said hangers, but other means may be employed, as well as other changes in the details shown and described.

With a reservation to ourselves of all such changes as will come within the scope of the following claims, what we do claim as new, and desire to secure by Letters Patent, is:—

1. A nut tapping machine, comprising a support, a revoluble nut carrier, means for engaging each of a plurality of nuts thereon, a spindle carrier, a rotating spindle over each nut, means for revolving said carriers simultaneously, a tap held in each spindle, positive means for forcing said spindles downwardly to force said taps into nut engagement, a slidable rod in each spindle projecting thereover and resting on the tap, and a cam for forcing said rods downwardly successively to force the corresponding taps out of said spindles.

2. A nut tapping machine, comprising a support, a revoluble nut carrier, means for engaging each of a plurality of nuts thereon, a revolving spindle carrier, a rotating spindle therein over each nut, a tap in each spindle, a cam for forcing said spindles downwardly to carry said taps into nut engagement, a slidable rod in each spindle projecting thereover and bearing on the tap, and a cam for forcing said rods downwardly successively to force the corresponding taps out of said spindles.

3. A nut tapping machine, comprising a support, a revoluble nut carrier, means for engaging each of a plurality of nuts thereon, a spindle carrier, means for revolving the same, a rotating spindle over each nut, a tap in each spindle, a cam for forcing said taps into nut engagement, a rod slidable in each spindle projecting thereover and resting on the tap, a cam for forcing said rods downwardly successively to force the corresponding taps out of said spindles, and means for returning said taps to said spindles.

4. A nut tapping machine, comprising a support, a revoluble nut carrier thereon, means for holding each of a plurality of nuts thereon, a revoluble spindle carrier, a plurality of rotating spindles therein, a tap in each spindle over the corresponding nut, a cam for forcing said taps into nut engagement, a cam for forcing said taps out of said spindles and clear of the respective nuts, a tubular receiver for each tap beneath each nut, means for removing the tapped nuts from their carrier, and a cam for raising said receivers successively to return said taps to their respective spindles.

In testimony whereof we have signed our names to this specification in the presence of two subscribing witnesses.

THOMAS MARION DANIELS.
JULIUS C. HOLSCHEMACHER.

Witnesses:
MAX FREICHEL.
WILLIAM B. ROSE.

Copies of this patent may be obtained for five cents each, by addressing the "Commissioner of Patents, Washington, D. C."